July 27, 1948.  C. B. WALWORTH, JR  2,445,813
SHADED POLE MOTOR
Filed Aug. 18, 1945  3 Sheets-Sheet 1

Inventor
Clarence B. Walworth Jr.
By Roberts, Cushman & Grover
Att'ys.

July 27, 1948. C. B. WALWORTH, JR 2,445,813
SHADED POLE MOTOR
Filed Aug. 18, 1945 3 Sheets-Sheet 2
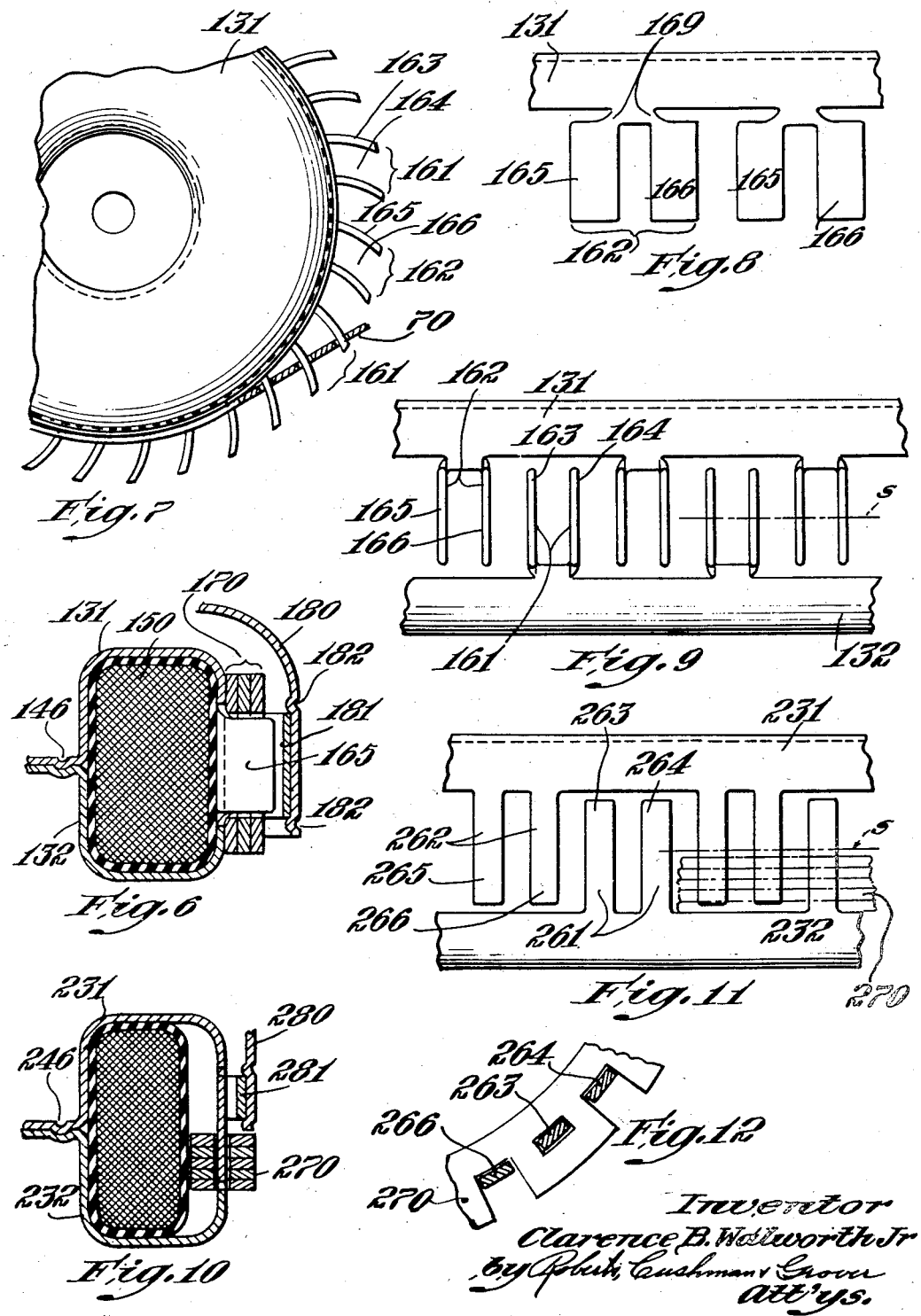

July 27, 1948.  C. B. WALWORTH, JR  2,445,813
SHADED POLE MOTOR
Filed Aug. 18, 1945  3 Sheets-Sheet 3
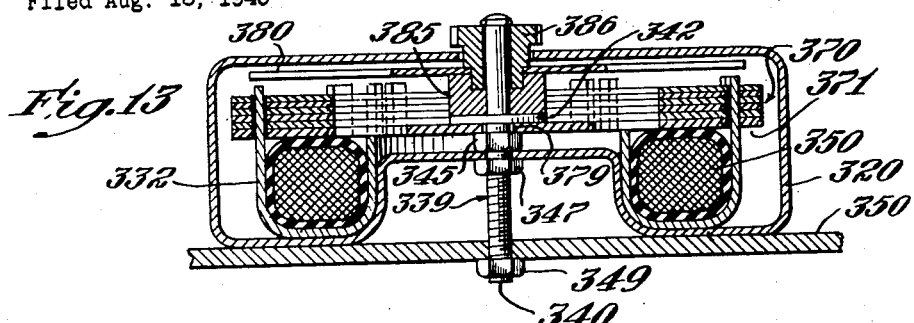
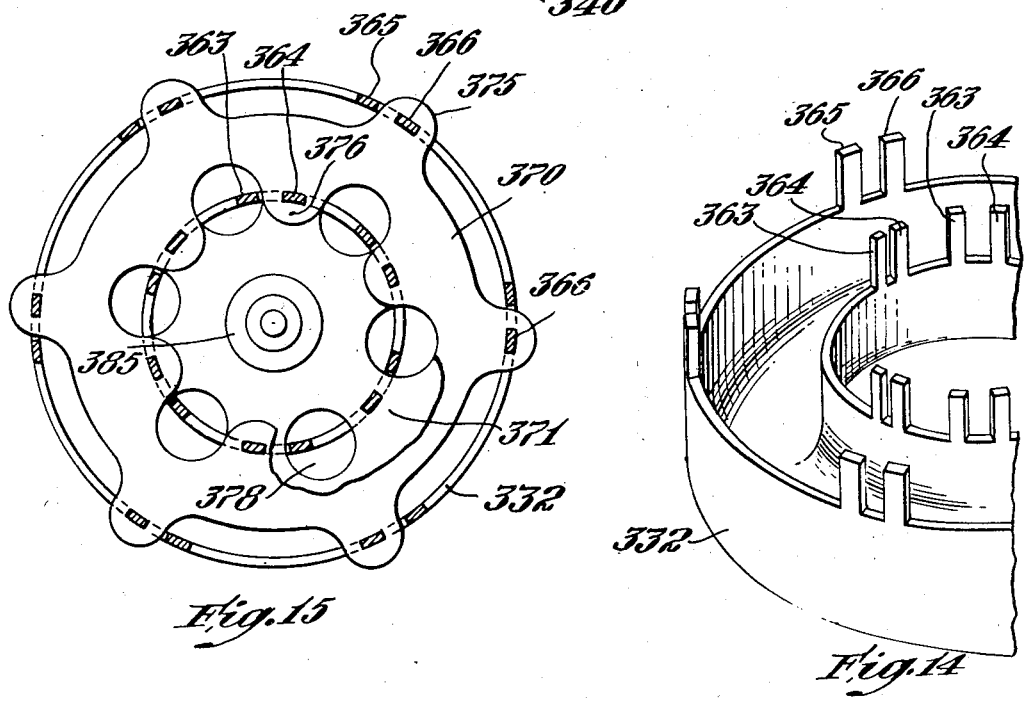
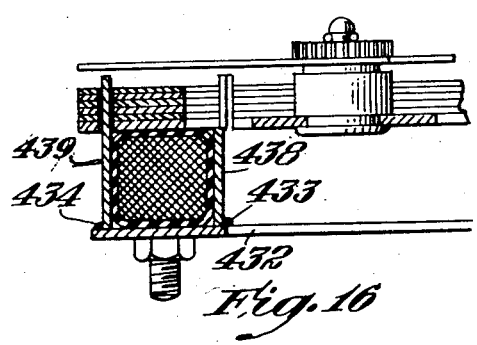
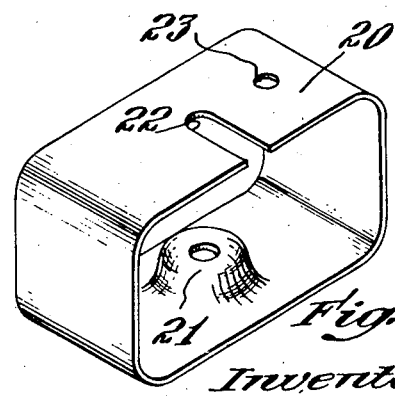
Inventor
Clarence B. Walworth Jr
by Roberts, Cushman & Groor
att'ys.

Patented July 27, 1948

2,445,813

UNITED STATES PATENT OFFICE 2,445,813

SHADED POLE MOTOR

Clarence B. Walworth, Jr., West Rocky Hill, Conn.

Application August 18, 1945, Serial No. 611,276

18 Claims. (Cl. 172—275)

This invention pertains to electric motors, particularly to reaction type synchronous motors such as are employed, for example, for driving clock or relay mechanisms.

The principal object of the present invention is to provide a motor of this type which is of very simple construction employing a minimum number of parts and which may be made in very small sizes if desired, but which is rugged and durable, has good starting characteristics and is capable of delivering a high torque. A further object is to provide a motor of this type most of whose parts may be made from sheet material by simple stamping or die press operations, which may readily be assembled without requiring high skill, and which may be provided with shading coils of a simple and highly effective construction. Still another object is to provide such a motor which has favorable operating conditions due to a peculiar correlation of the pole elements of the energizing member and a shading coil.

These and other objects and advantages will be pointed out in the following more detailed description of several embodiments illustrating the characteristic features of the invention with reference to the accompanying drawings, wherein Fig. 1 is a diametrical section through the motor post, of one embodiment of the invention;

Fig. 5 is an isometric view of the frame shown in Fig. 1;

Fig. 6 is a fragmentary radial section, through the stator and rotor members of another embodiment of the invention, with the shading coil in place;

Fig. 7 is a plan view of the stator portion of a motor according to Fig. 6;

Fig. 8 is a developed fragmentary side view of a blank for a stator member according to Figs. 6 and 7, prior to bending the pole teeth;

Fig. 9 is a view similar to Fig. 8 after the pole teeth are bent, showing both stator members;

Fig. 10 is a fragmentary radial section similar to Fig. 6, of a third embodiment of the invention;

Fig. 11 is a developed fragmentary side view of the stator portion of the embodiment according to Fig. 10;

Fig. 12 is a fragmentary elevation of a shading ring for a motor according to Figs. 10 and 11, with the respective pole teeth in section;

Fig. 13 is a radial section, similar to Fig. 1, of a fourth embodiment of the invention;

Fig. 14 is a fragmentary isometric view of the stator shell according to Fig. 11;

Fig. 15 is a top view of the motor according to Figs. 13 and 14 with the rotor removed and part of the upper shading members broken away; and Fig. 16 is a fragmentary radial section, similar to Figs. 6 and 10, of a fifth embodiment of the invention.

Figure 1:
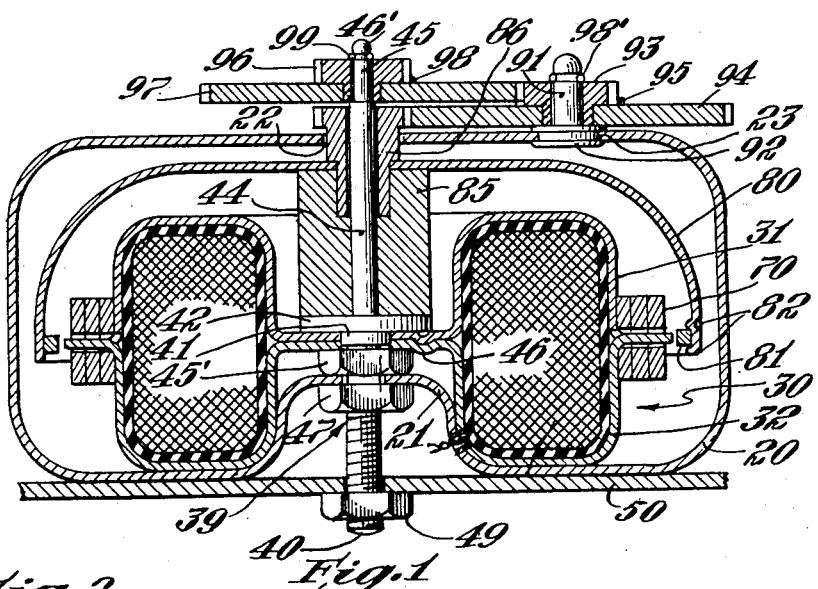

In Figs. 1 and 5, numeral 20 designates a supporting frame or housing of generally rectangular shape, open on both sides, and having a raised bottom portion 21 which fits the cup-shaped inner portion of the stator element 30, to be described hereinbelow. The top portion of frame 20 may be perforated such as at 22 and 23 for mounting a gear means, likewise to be described below. This frame may be made of any desirable non-magnetic material.

The stator 30 comprises an upper toroidally dished member 31 and a similar lower member 32 stamped and formed from appropriate magnetic sheet material, each member having a central aperture for post 39. This post is provided with a screw portion 40, a shoulder portion 41 for centering the two stator members, a flange 42 for supporting the bearing structure to be described below, a smooth bearing portion 44, and at its upper end a portion of reduced diameter 45, with an angular groove for a hairpin fastener or similar provision for keeping the gear wheels in place. The two stator members are held together by means of a nut 45' on the threaded portion 40 of post 39, clamping members 31 and 32 against shoulder 42 of the post. The members may be secured against radial displacement by a common punch detent 46.

By appropriately extending portion 40, the housing 20 may be fastened to a base or any suitable mounting support 50, by means of nut 49, as shown in Fig. 1.

Each stator member has an annular groove or channel portion 51, 52 respectively, (Fig. 3) which together provide an annular housing of approximately rectangular cross-section for a doughnut-shaped exciter coil 50 (Fig. 1). The inner walls of this housing constitute the pole portion of the stator, whereas the edge portions provide the gap of the magnetic path from stator to rotor.

Figures 2, 3:
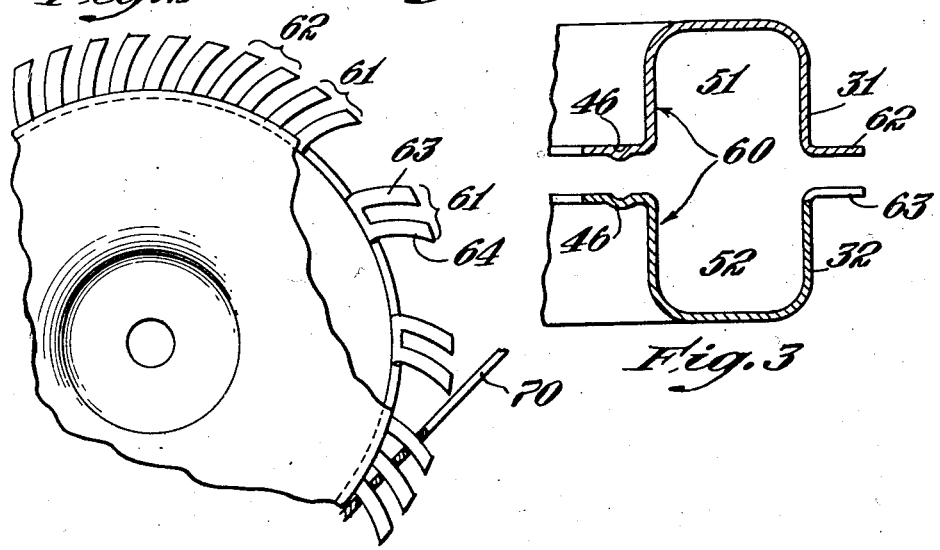
Fig. 2 is a plan view of the stator portion of a motor according to Fig. 1, with part of the upper member broken away and showing the pole teeth of the other member.
Fig. 3 is a fragmentary radial section, to larger scale, through the stator members.
Figure 4:
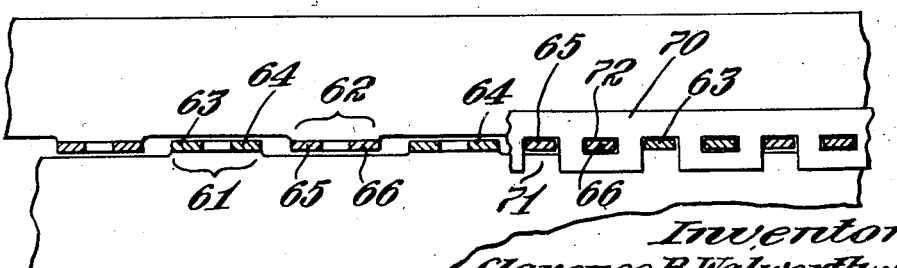
Fig. 4 is a developed fragmentary side view, with the pole teeth in section and showing a portion of the shading coil.

Each stator member has punched on its periphery a series of alternate pole elements 61, 62 respectively (Figs. 2, 3 and 4), which are so shaped and bent that the pole elements of the upper as well as the lower members are approximately within a plane perpendicular to post 39. As shown in Figs. 2 and 4, each pole element is bifurcated to form two pole teeth 63, 64 and 65, 66, respectively, which teeth are preferably punched with a curvature as shown in Fig. 2, for the purpose of ready assembly of the shading coil now to be described.

The shading coil employed to provide a phase displacement between the magnetic flux of adjacent pole teeth, has the shape shown in Fig. 4, namely recesses 71 alternating with openings 72, the opening 72 providing complete shading windings around teeth 64 and 66, whereas teeth 63 and 65 remain electrically unaffected by the shading coil. The shading coil is wound on the stator element as indicated in Fig. 2, the curvature of the pole teeth assuring a snug fit of the shading coil apertures and recesses. If only one convolution of the shading coil is to be wrapped around the stator element, the recesses 71 and the opening 72 may be of substantially the same dimensions and distances throughout the coil strip. If, however, the shading coil is to have more than one convolution, the consecutive series of recesses and apertures, for the additional coil layers have preferably somewhat larger distances so that all windings may snugly fit the pole teeth in spite of the increasing radii of the layers. If the pole teeth dimensions should change with increasing radius, the shading strip dimensions will vary accordingly for consecutive series of openings. As shown in Fig. 1, the length of teeth 63 to 66 corresponds approximately to the total thickness of the shading coil layers. The outer end of the shading coil is secured by appropriate means, for example a drop of solder.

The rotor element consists preferably of a bell-shaped member of light metal 80 such as aluminum or aluminum alloy and carries at the inside of its peripheral edge an annulus of magnetic material 81, which may be secured to the rotor bell by means of detents 82.

The rotor 80 is secured to a bearing cylinder 85, preferably of porous, oil-retaining metal made by compressing powdered particles, and thus being self-lubricating when saturated with oil, by means of a gear plug 86 which is pressed into a cylindrical recess of bearing block 85, confining the rotor bell therebetween, as clearly shown in Fig. 1. The gear plug 86 fits loosely around the above described smooth post portion 44, so that the bearing body 85 can freely rotate on member 42 and shank 44 which provide ample bearing surfaces.

A bearing stud 91 is fast in the above-mentioned opening 23 of housing 20, for example by means of a rivet head 92. Stud 91 loosely carries a gear structure consisting of a pinion 93 and a gear wheel 94, which are appropriately joined, for example by means of a spot weld 95 or by providing a spun press fit as likewise indicated in Fig. 1. Post 40 supports similarly on its upper recessed portion 45, a gear structure comprising pinion 96 and gear wheel 97 fastened together at 98. Gears 93, 94 and 96, 97 are secured to their post studs by means of hairpin fasteners, indicated at 98' and 99 of Fig. 1. It will be evident that a miniature ball thrust bearing can be inserted between member 42 and block 85, in order to assure extremely long life for a motor of this general type.

It will further be evident that the inner walls of stator channels 51, 52, indicated in Fig. 3 at 60, form the magnetic core of the stator, making any other particular pole structure unnecessary. While the magnetic path of the motor may be formed of any suitable metal, for example from sinter pressed powder material, the manufacture of this component of the motor by drawing magnetic sheet steel in the direction of the magnetic flux is especially advantageous, since it provides an especially advantageous flux path due to the molecular rearrangement during the flow of the metal while being shaped.

A motor of this type is assembled by inserting coil 50 into one of the annular grooves of the stator structure, while threading the lead wires 101 of the coil through an opening of the stator structure, as indicated in Fig. 1. The stator members are then joined by means of nuts 45, and wrapped with the shading coil 70, as above described. It will be evident that the wrapping of the shading coil about the stator or pole portion provides an especially rigid construction. The rotor assembly, consisting of bell 80 with magnet annulus 81, bearing block 85 and gear plug 86 is then put onto post stud 44, whereupon the open frame 20 can be placed into position by somewhat deforming it while inserting the dished portion 21 into the recess of stator element 32, while slipping the slot 22 over gear plug 86. Gear assemblies 93, 94 and 96, 97 are then put onto their post studs and secured with the hairpin fasteners. Housing 20 is then pressed into member 32 by means of nut 47, screwed to the threaded end 40 of post 39, which completes the assembly by securing the frame 20 firmly to the stator structure.

The operation of motors of this type depends, as mentioned above, on the effect of the shading coil and the magnetic property with regard to saturation, of the rotor metal, which causes phase displacement of the magnetic flux in alternate pole teeth, providing in known manner the favorable starting and polyphase synchronous operating characteristics which are desirable in motors of this type. It will be evident that the magnetic flux surrounds coil 50, with very little stray flux entering the central or core portion 60 of the stator structure, and is closed through the annulus 81, carried on the non-magnetic rotor bell 80.

The embodiment shown in Figs. 6 to 9 may be quite similar to that described above, with the exception of the pole teeth construction.

As indicated in Figs. 6 and 7, the pole teeth of this embodiment extend in generally radial direction with alternate pairs of teeth 161, 162 projecting from the upper and lower stator members 131 and 132, respectively. These teeth are formed by punching the stator member as indicated in Fig. 8 and then bending the pole portions outwardly at 169, giving them at the same time the curved configuration indicated in Fig. 7, for the purpose of facilitating the assembly of the shading coil. As indicated in Fig. 9, which, for the sake of simplicity, does not indicate the curvature of the pole teeth, the planes of the teeth contain the motor axis, and they have a common plane of symmetry perpendicular to that axis; this plane is indicated in Fig. 9 at s. The shading coil structure is similar to that explained above with reference to Figs. 1, 2 and 4, with the difference that the recesses and apertures conform to the shape of pole teeth 163, 164, and 165, 166, that is, the longer dimensions of these recesses and apertures extend transversely of the shading coil strip, whereas their longitudinal dimensions are comparatively short, conforming to the thickness of the sheet material from which the stator elements are punched.

The rotor structure is similar to that described above with reference to Fig. 1, but, due to the modified shape of the teeth, the magnetic annulus preferably assumes the shape of a strip 181 which may consist of a piece of watch spring steel, secured to the rotor bell by means of detents 182.

The assembly and operation of the embodiment according to Figs. 6 to 9 is quite similar to that described above with reference to the first embodiment; it will be noted that the magnetic flux again surrounds the coil 150, and is closed through ring 181 which extends over the entire height of the pole teeth.

A third embodiment, shown in Figs. 10 to 12, is similar to that described with reference to Figs. 6 to 9, with the difference that the teeth are not bent outwardly, but lie in a cylindrical plane coaxial with the rotor axis. As shown in Fig. 11, pole elements 261 and 262, with teeth 263, 264, and 265, 266, alternate, with the plane of symmetry of the teeth again being normal to the motor axis, as indicated at s.

This embodiment employs, instead of a shading coil, an appropriate number of shading rings 270, which are punched as indicated in Fig. 12. As shown in Figs. 10 and 11, the shading rings occupy only the lower half of the pole teeth, whereas the rotor iron 281 covers the remaining upper half the teeth portion, the magnetic flux closing through that upper tooth portion and the watch spring annulus 281.

A fourth embodiment of the present invention will now be explained with reference to Figs. 13 to 14.

As shown in Figs. 13 and 14, the stator element of this embodiment consists of a single stamping 332. As particularly indicated in Fig. 14, the pole teeth extend upwardly from the two concentric edges of the half-doughnut shaped stator body, such that pairs of outer pole teeth 365, 366, are placed symmetrically to the directions of the radii extending halfway between inner pole teeth pairs 363, 364. The stator body is closed, and the magnet coil 350 kept in place, by shading members 370 which, with the exception of the lowest member 371, have an annular shape with projections 375, 376 extending outwardly and inwardly, respectively. The pole teeth 366 and 364 respectively, are shaded, whereas teeth 363 and 365 are electrically not affected.

As indicated in Fig. 15, the lowest shading member 371 has circular openings 378 which perform the function of the corresponding recesses of the upper shading member, and a central opening 379 (Fig. 13) for the mounting post 339. The member 342 supports the bearing block 385 which may again comprise a ball bearing and be made of porous oil-saturated metal, and which is fastened to member 371 by means of a nut 345, as indicated in Fig. 13.

The rotor construction shown in Fig. 13 is similar to that explained with reference to Fig. 1, with the difference that the rotor proper is in this case a plan member 380, fastened to bearing block 385 by means of press fitted gear block 386. The entire motor assembly may be fastened to the supporting structure 350 by means of bolt extension 339 and nut 340.

The magnetic flux again surrounds coil 350, closing through the teeth and the peripheral portion of rotor member 380.

A further embodiment of the present invention is indicated in Fig. 16. This construction is rather similar to that described above with reference to Figs. 13 to 15, with the exception that, instead of being pressed from a single sheet, the stator structure consists of a flat member 432, to which are welded at 433 and 434 two cylindrical teeth-carrying rings 438 and 439.

It should be understood that the present disclosure is for the purpose of illustration only and that this invention includes all modifications and equivalents which fall within the scope of the appended claims.

I claim:
1. In an electric motor of the type described, an energizing member having a substantially circular sheet steel body with two substantially continuous circular central plate portions shaped to fit onto each other and each portion being surrounded by an annular channel supplementing the other channel to form an annular housing for an energizing coil and a toothed edge portion peripherally around said housing, a second bell-like member having a substantially circular edge portion shaped to conform to said edge portion of said first member, a supporting column, means for fastening one of said members to said column in alignment with the axis of symmetry of said member, and means for supporting the other member on said column for rotation relatively to said first member with said two edge portions in close proximity.

2. In an electric motor of the type described, an energizing stator member having a substantially circular body of magnetic material with two substantially circular central portions shaped to fit each other, each portion being surrounded by an annular channel supplementing the other channel to form an annular housing for an energizing coil and a substantial circular edge, and each portion having a central perforation, a supporting column adapted to fit said perforations, means for fastening said column to said body with said portions firmly in contact to provide a uniform flux path within said coil, a rotor member having a substantially circular edge shaped to conform to said edge of said stator member, and means adapted to mount said rotor member on said column for rotation relatively to said stator member with said two edges in close proximity.

3. In an electric motor of the type described, an energizing member having a substantially circular sheet steel body with two substantially circular central portions shaped to contact each other and each portion being surrounded by an annular channel formed from said sheet, said channels fitting together to constitute an annular housing, and a substantially annular energizing coil confined in said housing.

4. In an electric motor of the type described, an energizing member comprising two substantially circular sheet steel bodies each having a substantially circular central plate portion shaped to contact the central portion of the other body and each central portion being surrounded by an annular channel formed from said sheet and together with the channel of the other body forming an annular housing and a central magnet core, a substantially annular energizing coil adapted to be confined in said housing, and means for securing together said bodies with said coil held within said housing.

5. An electric motor of the type described comprising two bodies having central plate portions each surrounded by a substantially annular channel, said two channels supplementing each other forming a central magnetic core and a housing for an energizing coil, and formed integrally with each of said bodies a plurality of individual pole teeth, said teeth extending from the peripheral walls outwardly of said channels substantially in a common surface.

6. An electric motor of the type described comprising two bodies having central plate portions each surrounded by a substantially annular channel, said two channels forming a housing for an energizing coil, and formed integrally with each of said bodies a plurality of individual pole elements, said elements extending from the peripheral walls outwardly of said channels substantially in a common surface, and with the elements from the respective bodies alternatingly arranged.

7. An electric motor of the type described comprising two bodies having central plate portions each surrounded by a substantially annular channel having peripheral walls intersecting a plane parallel to said bodies, said two channels together forming a housing for an energizing coil, and formed integrally with each of said bodies a plurality of individual pole elements, said elements extending outwardly from said peripheral walls substantially in a common flat surface substantially parallel to said plane.

8. An electric motor of the type described comprising two bodies having contacting central portions each surrounded by a substantially annular channel having peripheral walls, said two channels together forming a housing for an energizing coil, and formed integrally with each of said bodies a plurality of individual bifurcated pole elements, said elements extending outwardly from said peripheral walls substantially in a common surface, and with the elements from the respective bodies alternatingly arranged.

9. An electric motor of the type described comprising two circular bodies having central portions each surrounded by a substantially annular channel having peripheral walls intersecting a plane parallel to said bodies, said two channels together forming a housing for an energizing coil, and formed integrally with each of said bodies a plurality of individual pole teeth, said teeth extending outwardly and symmetrically from said peripheral walls substantially in a common cylindrical surface substantially normal to said plane.

10. An electric motor of the type described comprising two circular bodies having contacting central portions each surrounded by a substantially annular channel having peripheral walls substantially normal to the plane of said bodies, said two channels together forming a housing for an energizing coil, and formed integrally with each of said bodies a plurality of individual pole elements, said elements extending outwardly from said peripheral walls substantially in a common cylindrical surface substantially normal to said plane, and with the elements from the respective bodies alternatingly arranged.

11. In an electric motor of the type described a substantially circular body forming an annular housing for an energizing coil, and having on the outer periphery of said housing a plurality of individual pole teeth, said teeth being curved in the same direction to receive a perforated shading strip wound thereon.

12. In an electric motor of the type described a substantially circular body formed from two sheet steel plates each having a central plate portion fitting the other central portion and surrounded by a channel forming with the other channel an annular housing for an energizing coil, and a plurality of individual pole elements alternately formed on the outer periphery of said housing from said plates integrally therewith.

13. In an electric motor of the type described a magnetic circuit member having an annular housing portion for an energizing coil and a plurality of individual peripheral pole teeth extending from said housing, and a shading coil in the shape of a band having open portions which fit respective ones of said teeth, said coil being wound about said magnetic member with said teeth penetrating through said open portions.

14. In an electric motor of the type described a substantially circular body, having the shape of an annular channel, and being integral with a plurality of individual peripheral pole teeth alternatingly extending outwardly from the peripheral portions of said channel; and a non-magnetic shading coil in the shape of a band having alternating open recess and open window portions fitting consecutive teeth, said coil being wound about said body with said teeth alternatingly penetrating said recess and window portions.

15. In combination with a motor body having individual substantially radially extending pole teeth, a shading coil band having window portions fitting said teeth, the distances of said window portions increasing for consecutive series of windows corresponding to said teeth, whereby several layers of said band can be wound on said body with said teeth extending through said windows.

16. An electric motor of the type described comprising two sheet steel bodies having central portions each surrounded by a substantially annular channel having peripheral walls intersecting a plane parallel to said bodies, said two channels together forming a housing for an energizing coil, and formed integrally with each of said bodies a plurality of interlaced individual pole teeth, said teeth extending from said peripheral walls in substantially radial direction substantially at right angles to, and within two planes parallel to said plane.

17. In an electric motor of the type described, an energizing motor member having a substantially circular body forming an annular housing part with a concentrical core portion, two edge portions and a dished central portion, a second motor member shaped to bridge said edge portions, a supporting shaft column, and means confined in said central portion for concentrically mounting said first motor member on said column for relative rotation thereabout of said second member, said column having a threaded portion extending beyond said central portion for mounting the motor on a support.

18. In an electric motor according to claim 17, a housing of non-magnetic material shaped in the form of a frame having on one side an inwardly projecting portion centering the housing in said central portion, and having on two opposite sides openings engaging said column outside of and surrounding said motor members.

CLARENCE B. WALWORTH, Jr.

REFERENCES CITED

The following references are of record in the file of this patent:

UNITED STATES PATENTS

| Number | Name | Date |
|---|---|---|
| 1,236,309 | Johnson | Aug. 7, 1917 |
| 1,324,657 | Fosler | Dec. 9, 1919 |
| 1,440,729 | French | Jan. 2, 1923 |
| 1,829,686 | Swendsen | Oct. 27, 1931 |
| 1,935,208 | Haydon | Nov. 14, 1933 |
| 2,237,960 | Hansen et al. | Apr. 8, 1941 |
| 2,250,395 | Russell | July 22, 1941 |

FOREIGN PATENTS

| Number | Country | Date |
|---|---|---|
| 389,158 | Great Britain | Mar. 16, 1933 |
| 415,168 | Great Britain | Aug. 23, 1934 |
| 581,378 | Germany | July 26, 1933 |